US012571514B2

(12) United States Patent
Hohmann et al.

(10) Patent No.: US 12,571,514 B2
(45) Date of Patent: Mar. 10, 2026

(54) LIGHTING DEVICE FOR A MOTOR VEHICLE

(71) Applicant: Hella GmbH & Co. KGaA, Lippstadt (DE)

(72) Inventors: Carsten Hohmann, Warstein (DE); Alfons Michaelis, Borchen (DE); Martin Mügge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 55 days.

(21) Appl. No.: 18/505,255

(22) Filed: Nov. 9, 2023

(65) Prior Publication Data

US 2024/0159374 A1 May 16, 2024

(51) Int. Cl.
*F21S 43/245* (2018.01)
*F21S 43/14* (2018.01)
*F21S 43/249* (2018.01)

(52) U.S. Cl.
CPC ............. *F21S 43/245* (2018.01); *F21S 43/14* (2018.01); *F21S 43/249* (2018.01)

(58) Field of Classification Search
CPC .............................. F21S 43/249; F21S 43/245
See application file for complete search history.

(56) References Cited

U.S. PATENT DOCUMENTS 6,902,307 B2 6/2005 Strazzanti
10,259,378 B2 * 4/2019 Ellwanger .............. B60Q 1/302
10,266,039 B2 * 4/2019 Kinnou .................. B60Q 1/304
2014/0003075 A1 * 1/2014 Yamada ................. B60Q 1/268 362/511
2020/0173626 A1 * 6/2020 Jo ............................. F21K 9/61
2022/0299187 A1 * 9/2022 Mügge .................... F21S 43/15
2023/0235871 A1 * 7/2023 Hallitschke ............. F21S 43/14 362/511
2023/0273492 A1 * 8/2023 Yu ......................... F21S 43/401 349/115
2024/0125449 A1 * 4/2024 Muegge ................ F21S 43/245

FOREIGN PATENT DOCUMENTS

DE 102010006348 A1 8/2011
DE 102020132976 A1 6/2021
DE 102020201645 A1 8/2021
EP 4001745 A1 5/2022

* cited by examiner

*Primary Examiner* — Eric T Eide
(74) *Attorney, Agent, or Firm* — Husch Blackwell LLP

(57) ABSTRACT

A lighting device for a motor vehicle is provided with numerous light sources. A flat waveguide has one entry surface and at least one exit surface. A cover panel is provided, and the light generated by the light sources enters the waveguide, at least in part, through the entry surface, the light entering through the entry surface exits, at least in part, through the at least one exit surface, and the light exiting the waveguide through the at least one exit surface at least partially exits the lighting device through the cover panel. A housing is provided that at least partially encases the numerous light sources, the waveguide, and the cover panel. The thickness of the lighting device in the direction perpendicular to the length and width of the waveguide is less than 20-mm where light exits the cover panel when the lighting device is in operation.

17 Claims, 6 Drawing Sheets

LIGHTING DEVICE FOR A MOTOR VEHICLE

CROSS REFERENCE TO RELATED APPLICATIONS

This application claims priority to German Application No. 10 2022 129705.5, filed Nov. 10, 2022, the entirety of which is hereby incorporated by reference.

FIELD OF THE INVENTION

The present invention relates to a lighting device for a motor vehicle.

BACKGROUND OF THE INVENTION

In tail lamps or in headlamps, design has been an important factor for some time for signal functions in a motor vehicle, e.g. tail lights, brake lights, turn signals, or daytime running lights. Design has become even more important since the introduction of LED technology, because these small light emitting diodes, which are often used in larger numbers, can be used with greater flexibility than a single light bulb as the light source for a signal function, such that, in combination with the optics that are selected, they offer a variety of design possibilities.

One form of LED technology is OLED technology, in which the light source is not a small point, as is the case with a light emitting diode, but instead is planar and larger, such that a desired lighting surface can be obtained with a very homogenous light emission. One disadvantage with OLED technologies is that the lamps obtained therewith are much more expensive than those using LED technology. The reasons for this include a complex production process, the different shaping processes necessary for specific designs, and lower supplies. The automotive industry also has special requirements, such as resistance to UV radiation and the effects of various forces such as vibrations, impacts and jolts, as well as thermal resistance in the range of −40° C. to +85° C. or +100° C. These requirements are much harder to satisfy with an organic light emitting diode than with a standard light emitting diode.

As a result, alternatives have been sought, with which it is possible to obtain a design that is similar to that which can be obtained with organic light emitting diodes (OLED), in particular with a homogenous lighting surface. This has been achieved through the use of light emitting diodes (LED) with a flat waveguide and upstream optics formed by microstructured films or thin lenses, which diffuses the light emitted from the waveguide. This results in a flat light module that exhibits a high performance level with a homogenous illumination of the entire surface of any size or shape.

Just as with organic light emitting diodes, numerous flat light modules can be positioned adjacent to and behind one another in a tail lamp in order to generate the desired specific appearance of the signal, e.g. tail lights, or brake lights.

One exemplary flat light module is composed of front and back housing parts that are snapped together. The front part of the housing can comprise two parts, one of which is a transparent panel. A flat waveguide with microlenses, a white, diffused reflecting film behind the waveguide, and two or three microlens films in front of the waveguide are placed between the housing parts, which are responsible for the light distribution and efficiency of the system, because the individual micro-optics components are coordinated to one another. The microlens films can also be thin, sputtered lenses.

It is only possible to obtain planar, glass-based elements with the current OLED lighting technologies, for which reason numerous OLEDs are usually used, because of their low light density, which are then supplemented with additional LEDs surrounding them to obtain the necessary luminosity for a tail light. It has not been possible to obtain surfaces that are curved and large enough to satisfy the requirements for motor vehicle lamps with OLEDs.

Another disadvantage with using OLEDs or flat light modules in tail lamps is that they require an additional housing, additional cover, and usually other internal components such as shutters. The development process is also more complicated, more materials are need for molding tools and molded parts, and the production process is more complex. These tail lamps also require more installation space in the body of the vehicle, which further require more shaping steps and tools, and potentially separate body parts that have to be welded on if it is not possible to obtain the necessary space with shaping processes.

BRIEF SUMMARY OF THE INVENTION

The fundamental problem addressed by the invention is therefore to create a lighting device of the type specified above that is as flat, space-saving, and requiring as little material as possible, and which can be manufactured inexpensively.

According to an embodiment, the lighting device comprises: numerous light sources; a flat waveguide, exhibiting a length and a width perpendicular thereto, as well as a depth that is perpendicular to the length and the width, with the length being greater than the width, and the width being greater than the depth, in which the waveguide has an entry surface and at least one exit surface; a cover panel, wherein the lighting device is configured such that the light from the light sources enters the waveguide through the entry surface, the light entering through the entry surface exits at least in part through the exit surface, and the light exiting the at least one exit surface exits the lighting device, at least in part, through the cover panel; a housing that encloses the numerous light sources, the waveguide, and the cover panel, at least in part, wherein the thickness of the lighting device is less than 20 mm where light exits the lighting device, in particular less than 15 mm, preferably less than 12 mm, e.g. less than 10 mm.

Unlike with numerous adjacent flat light modules, it is possible to obtain a lighting device in this manner that has just one housing, thus reducing the production costs. The lighting device forms a large flat tail lamp, for example.

The length of the lighting device in the direction of the waveguide can be greater than 50 cm, in particular greater than 100 cm, preferably greater than 150 cm, and/or the lighting device can be designed to span the entire width, or nearly the entire width, of the motor vehicle. This results in a flat tail lamp that forms a strip extending over the entire width, or nearly the entire width, of the motor vehicle. This strip can be an uninterrupted lighting surface with which different signals can preferably be generated. This flat tail lamp can also be divided into shorter left and right tail lamps, like conventional tail lamps, without sacrificing the advantages of a tail lamp design spanning the entire width.

The waveguide can have two end surfaces, two narrow surfaces over its length, and two wide surfaces over its length, with the entry surface for the waveguide formed on one of the narrow surfaces extending over the length of the waveguide. The at least one exit surface can be formed on one of the wide surfaces extending over the length of the waveguide, and, in particular, one exit surface can be formed on each of the wide surfaces extending over the length of the waveguide. The outer shape of the housing above the waveguide, on the side opposite the narrow lower surface of the waveguide that forms the light entry surface where the light source is located, can have a variety of shapes. The outer surface of the tail lamp can have any arbitrary design, and therefore does not have to be substantially rectangular.

The lighting device, and/or the waveguide can be curved over the length of the waveguide. This curvature can follow the contour of the vehicle body, such that the lighting device fits the motor vehicle harmoniously.

The lighting device can be designed to be attached to the outside of the motor vehicle body, or placed in a recess in the vehicle body. Both of these variations have the potential for significant savings in terms of complexity and the resources necessary for creating and manufacturing a suitable vehicle body, as well as for the lighting device itself, which can be very compact, using a minimum of materials.

The lighting device can have two projections at the ends along the length of the waveguide, which are designed to extend into the motor vehicle when it is installed. These projections are designed to attach the lighting device and hold it in place. The lighting device can be pushed through a hole in the body, and then held in place with threaded fasteners. It is also possible to design it such that it can be snapped onto the body or a mount behind the surface of the body. The electrical contact between the lighting device and the motor vehicle can also be obtained through these projections. There can also be a plug-in contact connecting the lighting device to the vehicle on the back of the lighting device, e.g. in the middle.

The light sources can be placed next to each other over the length of the waveguide. These light sources can be light emitting diodes, ideally placed on a single printed circuit board. The printed circuit board can lie, at least in part, opposite the entry surface of the waveguide, in particular such that the printed circuit board extends away from the waveguide in a direction perpendicular to the length and width thereof, such that the thickness of the lighting device where the printed circuit board is located is greater than where light exits the cover panel when the lighting device is in operation. The greater installation depth of the lighting device at the edges can have advantages regarding the structure of the lamp because this results in a sturdier edge, which contributes to the overall durability of the otherwise thin and fragile tail lamp. In addition, a shaped metal piece made of steel or aluminum can also be placed underneath the printed circuit board, extending to the fasteners on the sides thereof through the projections, which also contributes to the rigidity of the lighting device, and can also help in cooling of the light emitting diodes.

The light sources can also emit light of at least one first and one second color in order to obtain different signal functions, e.g. a tail lights, brake lights, turn signals, or daylight running lights. The lighting device can contain two adjacent segments of the waveguide over its length, which are not optically connected to one another, in order to separate the colors for the different signals, and/or the lighting device can be designed such that at least one of the light sources, preferably numerous light sources, can be shut off in a targeted manner to separate the colors for the different signal functions. This reduces color mixtures to an acceptable level.

The lighting device can contain at least one microstructured film and/or one microstructured lens, which are placed between the waveguide and the cover panel. The lighting device can also contain an at least partially reflective surface located on the side of the waveguide facing away from the cover panel, such that the light exiting the waveguide at the exit surface facing away from the cover panel strikes the reflective surface, is then reflected back toward the exit surface, and at least partially reenters the waveguide before exiting the exit surface facing the cover panel, and passes through the at least one cover panel. A high performance level is obtained with the lighting device, like that obtained with a flat light module, through rear surface reflection of the light exiting the waveguide and a homogenous illumination of the front surface through targeted diffusion on the microstructured films and/or lenses.

A liquid-crystal display, in particular a passive LCD such as a guest-host display or smart glass display, can be placed between the waveguide and the cover panel, which can be switched at least on and off, such that when it is on, the light exiting the waveguide passes at least partially through the LCD, and when it is off, none of the light exiting the waveguide passes through the LCD. This type of display can also be extremely thin, e.g. 1 mm, such that the display does not make the lighting device substantially thicker. The display can be segmented into a number of surfaces that can be turned on and off, such that they can be switched to either transparent or opaque black. This makes it possible to animate the signal functions, as well as act directly on the color separation between signal of different colors by switching some of the segments in the display to black.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE INVENTION

Figure 1:
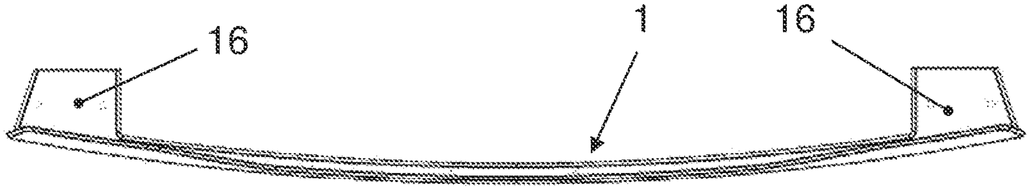
FIG. 1 shows a top view of a first embodiment of the lighting device according to the invention.

The lighting device 1 illustrated in the drawings is a tail lamp in particular. The lighting device 1 contains numerous light sources 2, formed by light emitting diodes (LED) (see FIG. 13 and FIG. 14 by way of example). The numerous light emitting diodes can be of different colors with which their functions can be doubled or tripled. These can form navigation lights, daylight running lights, and turn signals, or navigation lights, daylight running lights and autonomous driving indicators, in which case the autonomous driving indicator is cyan.

The lighting device also contains a flat waveguide 3. The waveguide 3 exhibits a length L, width Q that is perpendicular thereto, and depth T, which is perpendicular to the length L and width Q (see FIG. 3 and FIG. 13, by way of example). The length L of the waveguide 3 is significantly greater than the width Q. The width Q of the waveguide is also significantly greater than the depth T (see FIG. 3).

The waveguide 3 has two end surfaces delimiting its length L, which are not indicated in the drawings. The waveguide 3 also has two narrow surfaces 4, 5 over the length L thereof, which delimit the width Q. The waveguide 3 also has two wide surfaces 6, 7 over the length, which form the front and back surfaces of the flat waveguide 3.

The lower narrow surface 4 in the installed state and in the drawings forms the entry surface 8 for the waveguide 3. The upper narrow surface 5 could also form an entry surface.

At least one of the wide surfaces 6, 7 on the waveguide 3 forms an exit surface 9. Preferably, both the left and right surfaces 6, 7 in FIG. 3 form exit surfaces 9, 10.

Figure 3:
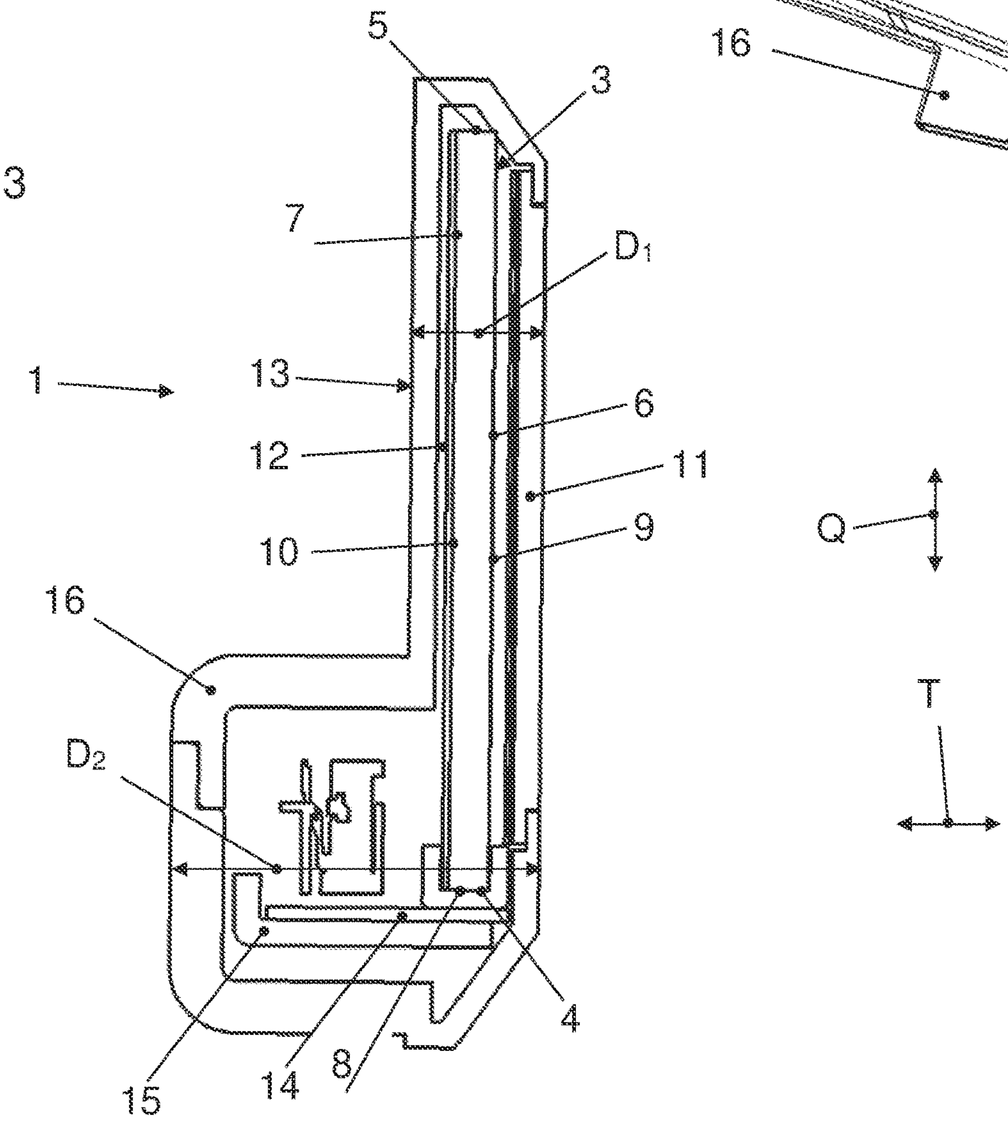
FIG. 3 shows a detail of the lighting device shown in FIG. 1.
Figure 13:
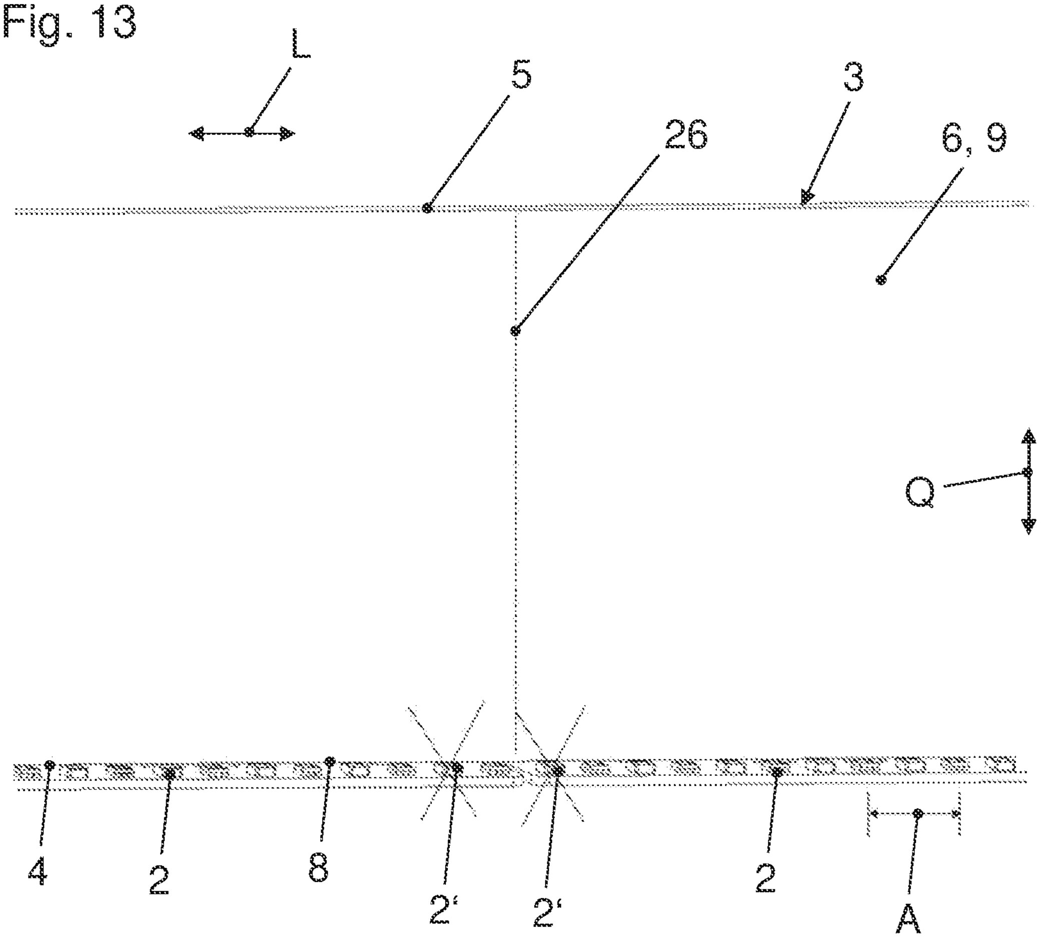
FIG. 13 shows a detail of an eighth embodiment of the lighting device according to the invention.

The light sources 2 are underneath the entry surface 8, such that the light emitted from the light sources can enter the entry surface 8 (see FIG. 3 and FIG. 13). The light sources 2 are adjacent to one another over the length L of the waveguide 3. The light entering the entry surface 8 can spread out in the waveguide and exit the waveguide toward the front, or the right side in FIG. 3, as well as toward the back, or the left side in FIG. 3, through the exit surfaces 9, 10.

The lighting device 1 has a cover panel 11 through which the light exiting the front exit surface 9 can exit the lighting device. The lighting device 1 also contains an at least partially reflective surface 12 on the side of the waveguide 3 facing away from the cover panel 11. The lighting device 1 is designed such that the light exiting the exit surface 10 on the waveguide 3 facing away from the cover panel 11 strikes the reflective surface 12, is reflected back toward the exit surface 10, and at least partially reenters the waveguide 3 before it exits the exit surface 9 facing the cover panel 11 and passes through the at least one cover panel 11.

The lighting device 1 can also contain at least one microstructured film and/or at least one microstructured lens, neither of which are shown in the drawings, which are then placed between the waveguide 3 and the cover panel 11 to homogenize the light passing through them. The lighting device 1 also has a housing 13 that encases the light sources 2, waveguide 3, cover panel 11, and reflective surface 12, as well as any microstructured films and/or lenses.

Figure 4A:
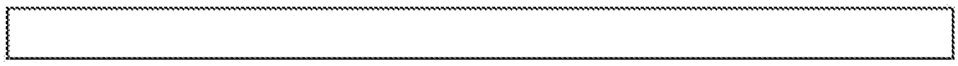
FIG. 4*a* shows a schematic front view of the lighting device shown in FIG. 1.
Figure 4B:
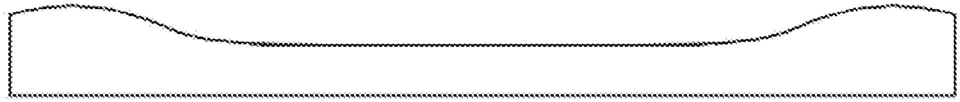
FIG. 4*b* shows a schematic front view of a second embodiment of the lighting device according to the invention.
Figure 4C:
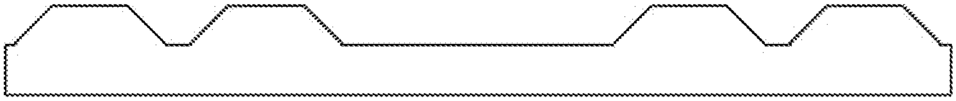
FIG. 4*c* shows a schematic front view of a third embodiment of the lighting device according to the invention.
Figure 4D:
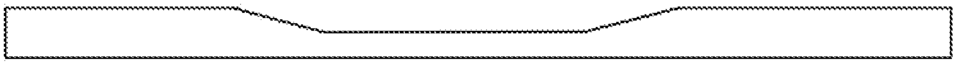
FIG. 4*d* shows a schematic front view of a fourth embodiment of the lighting device according to the invention.
Figure 5:
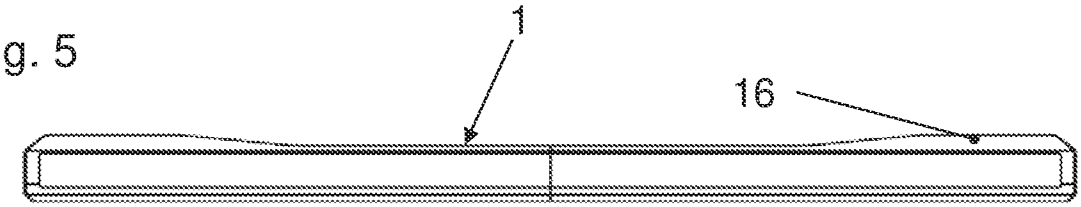
FIG. 5 shows a perspective view of a fifth embodiment of the lighting device according to the invention.
Figure 6:
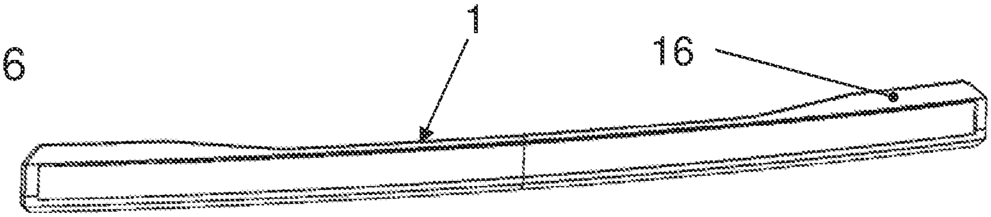
FIG. 6 shows the lighting device shown in FIG. 5 from another perspective.
Figure 7:
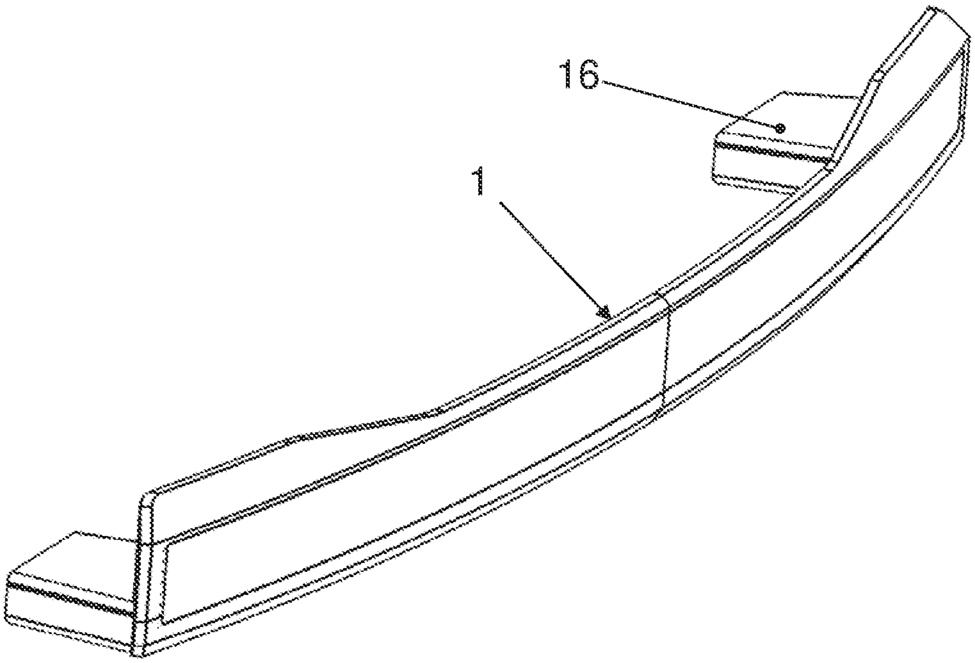
FIG. 7 shows a perspective view of a sixth embodiment of the lighting device according to the invention.

The outer shape of the housing lying opposite the narrow surface 4 extending along the length L of the waveguide 3 where the entry surface 8 or the light sources 2 are located, can exhibit a variety of designs. The outer shape of the lighting device 1 forming the tail lamp can therefore have an arbitrary design, which does not have to be rectangular (see FIG. 4*a*), and instead can vary therefrom (see FIG. 4*b*, FIG. 4*c*, and FIG. 4*d*, by way of example).

The light sources 2 are placed on a printed circuit board 14 beneath the entry surface 8. The printed circuit board 14 extends away from the waveguide 3 in a direction perpendicular to the length L and width Q, such that the thickness $D_2$ of the lighting device 1 where the printed circuit board 14 is located is greater than where light exits the cover panel 11 when the lighting device 1 is in operation (see FIG. 3).

The large structural depth of the lighting device 1 in the lower edge region can be advantageous for the structure of the lighting device 1 because this strengthens the edge region and contributes to the overall durability of a thin, fragile tail lamp. A reinforcing piece of shaped aluminum 15 is also placed beneath the printed circuit board 3 in the exemplary embodiment shown in FIG. 3, which further contributes to the rigidity of the lighting device and can also help in cooling the light emitting diodes.

By way of example, the thickness $D_1$ of the lighting device 1 where the light exits the cover panel 11 can be less than 12 mm, or even less than 10 mm. The thickness $D_2$ where the printed circuit board 3 is located can be between 20 mm and 30 mm.

Along the length L of the waveguide 3, the lighting device 1 can be longer than 150 cm, whereas the lighting device is designed in particular to extend over the entire, or nearly the entire, width of the motor vehicle. The lighting device 1 can also be divided into two separate tail lights for the left and right side of the vehicle, as with conventional tail lights.

Figure 2:
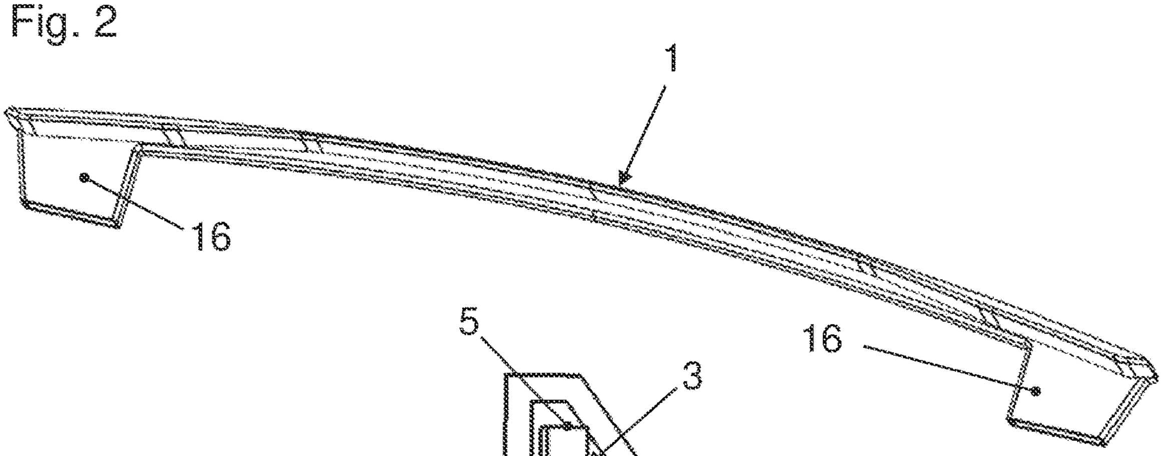
FIG. 2 shows a perspective view of the lighting device shown in FIG. 1.

The lighting device 1 in the first embodiment also has two projections 16 on the housing at the ends of the waveguide 3 along the length L thereof, which extend into the motor vehicle when installed thereon (see FIG. 1 and FIG. 2 by way of example).

Figure 8:
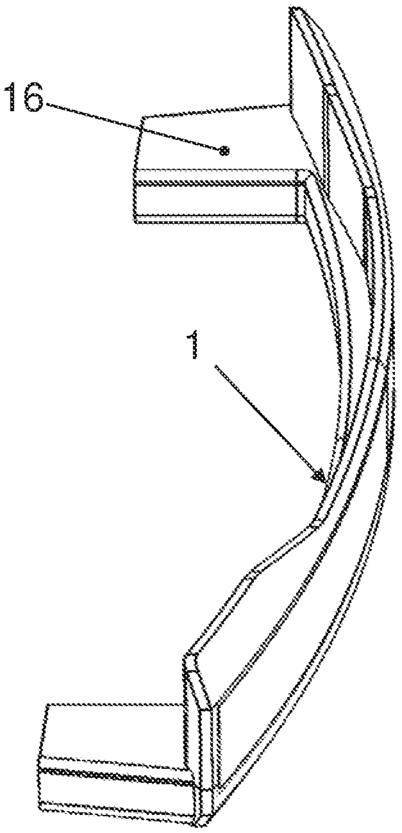
FIG. 8 shows the lighting device shown in FIG. 7 form another perspective.
Figure 9:
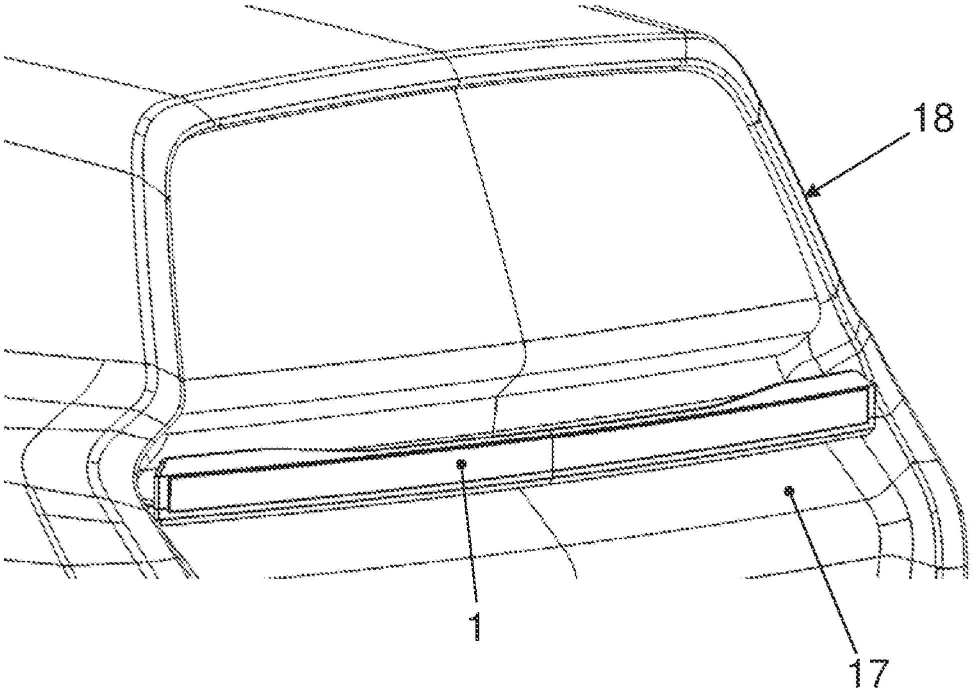
FIG. 9 shows a perspective rear view of a motor vehicle with the lighting device shown in FIG. 7 installed thereon.

In some of the embodiments shown in the drawings, the lighting device 1 and waveguide 3 are curved along the length L of the waveguide 3 (see FIG. 8, by way of example). This allows the lighting device 1 in the form of a tail lamp to be fitted to the rear end 17 of the motor vehicle 18 (see FIG. 9).

Figure 10:
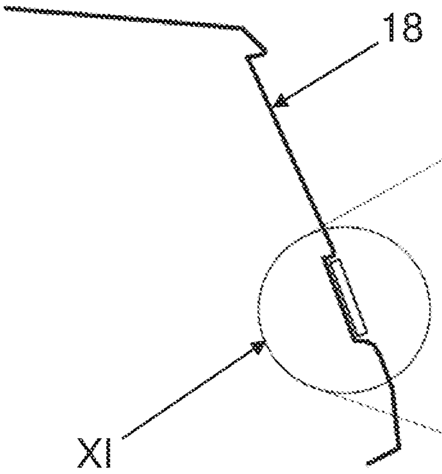
FIG. 10 shows a schematic sectional view cut through the rear of a motor vehicle, containing a seventh embodiment of the lighting device according to the invention installed thereon.
Figure 11:
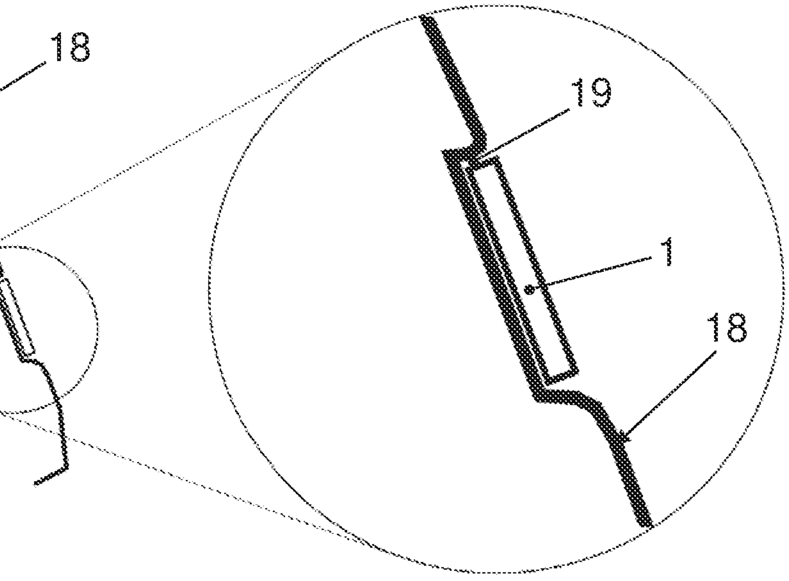
FIG. 11 shows a detail indicated by the arrow XI in FIG. 10.

In the seventh embodiment schematically illustrated in FIG. 10 and FIG. 11, the lighting device 1 is no thicker where the printed circuit board is located than where the cover panel 11 is located. This results in a very thin lighting device 1 with a constant width (see FIG. 11). This lighting device 1 can be place in a very shallow recess 19 on a motor vehicle 18. This embodiment can also be simply placed on the body of the motor vehicle.

Figure 12:
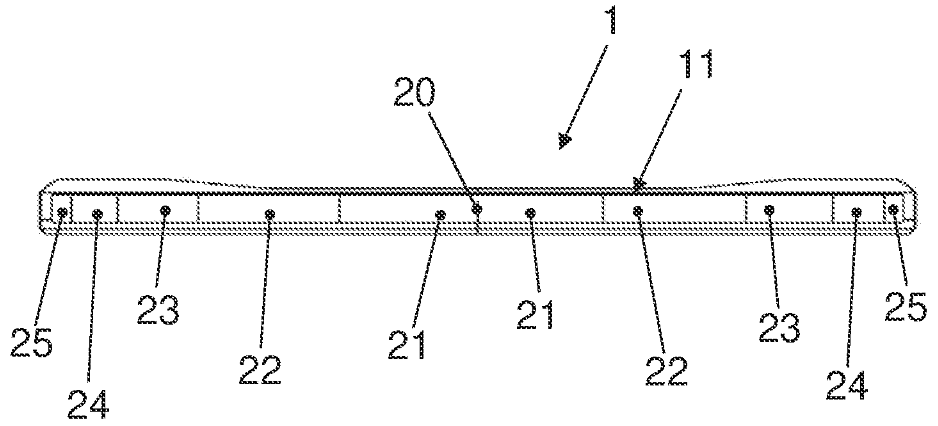
FIG. 12 shows a perspective view of the lighting device shown in FIG. 5, in which individual sections have been outlined to indicated the various functions of the lighting device.

The necessary signals can be placed in both sides of the lighting device 1 forming the tail lamp. There are light emitting diodes of different colors on the printed circuit board 14, which is broken down into different segments for this, in which there can be a light emitting diode of a different color next to each red light emitting diode. FIG. 12 illustrates a typical configuration of the different signals.

In a first segment 21 of the cover panel 11, or the waveguide 3, which is located in the middle, extending 300 mm to either side of the center line 20 of the cover panel 11, there can be red light emitting diodes for a tail light and cyan-colored light emitting diodes for the autonomous driving indicator. In the two adjacent second segments 22, there can be red light emitting diodes for the tail lights and white light emitting diodes that indicate when the vehicle is in reverse. In the adjacent third segments 23, there can be red light emitting diodes for the tail lights and for the brake lights. The adjacent fourth segments 24 can contain red light emitting diodes for the tail lights and yellow light emitting diodes for turn signals. The fifth segments 25 can contain red light emitting diodes for the tail lights and parking lights, as well as yellow light emitting diodes for turn signals.

The sizes of the segments 21, 22, 23, 24, 25 may vary, depending on the overall size of the tail lamp. To prevent or reduce color mixing to an acceptable level between the signals, e.g. between a turn signal (yellow) and a brake light (red), or between a brake light (red) and a reversing light (white), or between a reversing light (white) and an autonomous driving indicator (cyan), the light emitting diodes immediately adjacent to each side of a separation 26 between two segments 21, 22, 23, 24, 25 can be shut off in order to increase the distance between the first light emitting diodes contributing to each color.

This is illustrated in FIG. 13, in which each second light source 2 is a red light emitting diode, such that the distance A between the red light emitting diodes over the length L is 10 to 15 mm. Those light emitting diodes indicated by the reference numeral 2' can be shut off to improve color separation.

Figure 14:
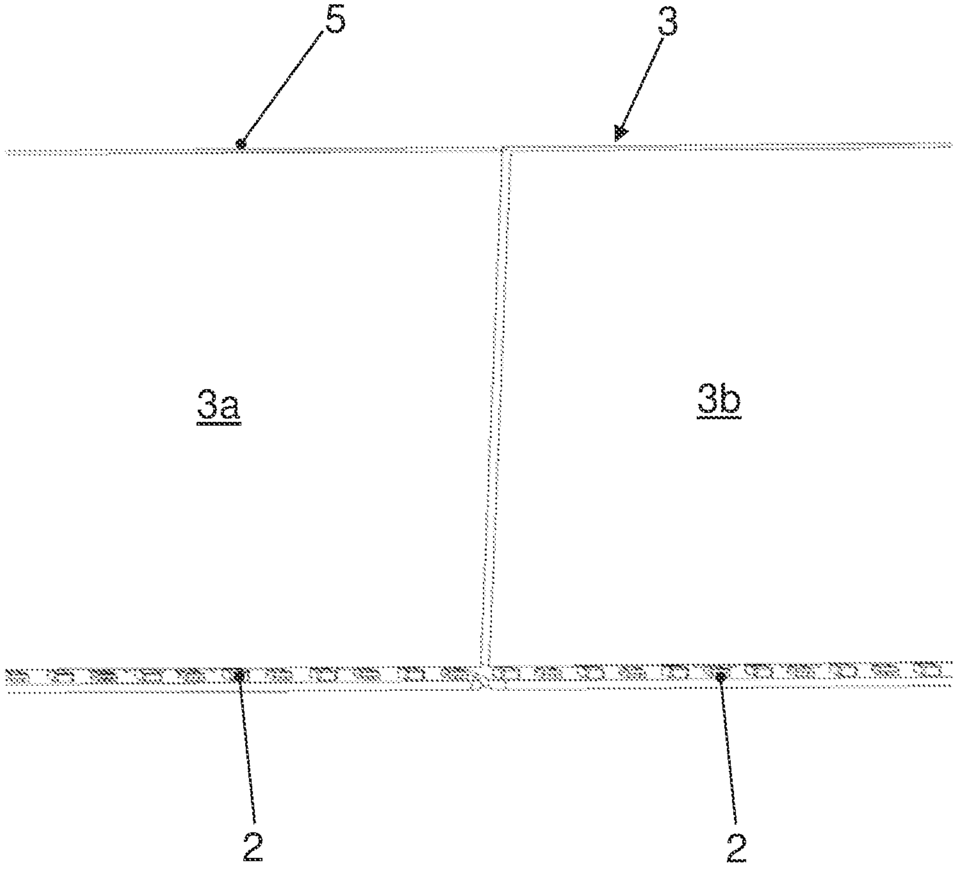
FIG. 14 shows a detail of a ninth embodiment of the lighting device according to the invention.

An alternative variation is shown in FIG. 14, in which the segments 3*a* and 3*b* of the waveguide 3 are separated from one another over the length L for purposes of color separation.

Figure 15:
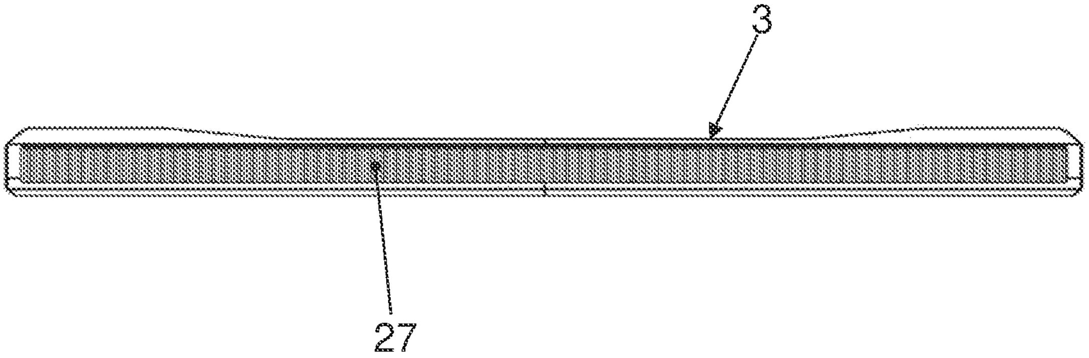
FIG. 15 shows a perspective view of a tenth embodiment of the lighting device according to the invention.

FIG. 15 shows an embodiment of a lighting device 1 according to the invention, which contains a liquid-crystal display (LCD), in particular a passive LCD such as a guest-host display or a smart glass display, between the waveguide 3 and the cover panel 11. The LCD can be switched at least in part between an operating mode and a standby mode, in which the light exiting the waveguide 3 passes at least in part through the LCD when in the operating mode, and no light exiting the waveguide 3 passes through the LCD when in the standby mode. The LCD can be made of glass, or in the case of a curved tail lamp, a film, which can have a thickness of just 1 mm, for example.

The LCD can be segmented into larger and smaller parts to obtain a number of areas that can switched on and off between transparent and opaque, for example. This makes it possible to animate the signals, as well as to directly affect the color separation between signal regions of different colors by switching some of the segments in the LCD to black where color separation is necessary. FIG. 15 shows an example of a striped pattern 27 illustrating an LCD. The LCD can also be segmented in other ways.

LIST OF REFERENCE SYMBOLS

- 1 lighting device
- 2 light source
- 2' light source in the form of a light emitting diode that is shut off
- 3 waveguide
- 3*a*, 3*b* segments of the waveguide
- 4, 5 narrow surfaces over the length of the waveguide
- 6, 7 wide surfaces over the length of the waveguide
- 8 entry surface of the waveguide
- 9, 10 exit surfaces of the waveguide
- 11 cover panel
- 12 reflective surface
- 13 housing
- 14 printed circuit board
- 15 shaped piece for reinforcing the lighting device
- 16 projection on the housing
- 17 rear end of a motor vehicle
- 18 motor vehicle
- 19 recess in a motor vehicle
- 20 central line through the cover panel
- 21, 22, 23, 24, 25 segments of the cover panel or waveguide
- 26 separation between two segments
- 27 striped patter
- L length
- Q width
- T depth
- $D_1$ thickness of the lighting device where the cover panel is located
- $D_2$ thickness of the lighting device where the printed circuit board is located
- A distance between red light emitting diodes

The invention claimed is:

1. A lighting device for a motor vehicle, the lighting device comprising:

a plurality of light sources;

a flat waveguide having two end surfaces delimiting a length (L), two narrow surfaces delimiting a width (Q) perpendicular to the length (L), and two wide surfaces delimiting a depth (T) perpendicular to the length (L) and the width (Q), wherein the length (L) of the waveguide is greater than the width (Q), and the width (Q) is greater than the depth (T), wherein the waveguide has one entry surface and at least one exit surface, wherein the entry surface is formed on one of the narrow surfaces, wherein the at least one exit surface is formed on at least one of the wide surfaces;

a cover panel, wherein the plurality of light sources face the entry surface and light generated by the light sources enters the waveguide, at least in part, through the entry surface, and then exits, at least in part, through the at least one exit surface, wherein the light exiting the waveguide through the at least one exit surface at least partially exits the lighting device through the cover panel; and a housing, wherein the plurality of light sources, the waveguide, and the cover panel are positioned within the housing;

wherein a thickness ($D_1$) of the lighting device along the depth (T) that is perpendicular to the length (L) and width (Q) is less than 20 mm where the light exits the cover panel when the lighting device is in operation.

2. The lighting device according to claim 1, wherein the length (L) of the lighting device along the waveguide is greater than 50 cm, and/or the lighting device extends over a majority of a width of the motor vehicle.

3. The lighting device according to claim 1, wherein the lighting device and/or the waveguide are curved over the length (L) of the waveguide.

4. The lighting device according to claim 1, wherein the lighting device is positioned on an outside of a body of the motor vehicle, or in a recess on the body of the motor vehicle.

5. The lighting device according to claim 1, wherein the lighting device has two projections proximate the end surfaces, wherein the projections extend into the motor vehicle in an installed state.

6. The lighting device according to claim 1, wherein the light sources are adjacent to one another over the length (L) of the waveguide.

7. The lighting device according to claim 1, wherein the light sources are formed by light emitting diodes on a printed circuit board.

8. The lighting device according to claim 7, wherein the printed circuit board is placed in part opposite the entry surface on the waveguide.

9. The lighting device according to claim 1, wherein at least one first and at least one second light source differ from one another regarding a color of the light they generate in order to obtain different signals for the motor vehicle.

10. The lighting device according to claim 9, further including two adjacent segments of the waveguide over its length (L) which are not connected to one another in order to separate the colors of different signals, and/or the lighting device shuts off at least one of the light sources in a targeted manner, in order to separate the colors of different signals.

11. The lighting device according to claim 1, further including at least one microstructured film and/or at least one microstructured lens.

12. The lighting device according to claim 1, further including an at least partially reflective surface on a side of the waveguide facing away from the cover panel, wherein the light exiting the exit surface on the waveguide facing away from the cover panel strikes the reflective surface, is reflected back toward the exit surface facing away from the cover panel, and at least partially reenters the waveguide before exiting the exit surface facing the cover panel and passing through the cover panel.

13. The lighting device according to claim 1, wherein a liquid-crystal display (LCD) is placed between the waveguide and the cover panel, wherein the LCD can be at least partially switched between an operating mode and a standby mode, wherein the light exiting the waveguide passes at least in part through the liquid-crystal display when in the operating mode, and no light exiting the waveguide passes through the LCD when it is in the standby mode.

14. The lighting device according to claim 1, wherein an exit surface is formed on each of the wide surfaces extending over the length (L) of the waveguide.

15. The lighting device according to claim 8, wherein the printed circuit board extends away from the waveguide in a direction perpendicular to the length (L) and width (Q), wherein a thickness ($D_2$) of the lighting device where the printed circuit board is located is greater than where the light exits the cover panel when the lighting device is in operation.

16. The lighting device according to claim 11, wherein the at least one microstructured film or the at least one microstructured lens is placed between the waveguide and the cover panel.

17. The lighting device according to claim 13, wherein the LCD is a passive liquid-crystal display.

* * * * *